US007466541B2

(12) United States Patent
Takeda

(10) Patent No.: US 7,466,541 B2
(45) Date of Patent: Dec. 16, 2008

(54) LIQUID CRYSTAL DISPLAY DEVICE

(75) Inventor: Kenichi Takeda, Osaka (JP)

(73) Assignee: Funai Electric Co., Ltd.

( * ) Notice: Subject to any disclaimer, the term of this patent is extended or adjusted under 35 U.S.C. 154(b) by 0 days.

(21) Appl. No.: 11/751,210

(22) Filed: May 21, 2007

(65) Prior Publication Data
US 2007/0273627 A1 Nov. 29, 2007

(30) Foreign Application Priority Data
May 24, 2006 (JP) ............... 2006-144020

(51) Int. Cl.
G06F 1/16 (2006.01)
(52) U.S. Cl. .................. 361/681; 361/683; 312/223.1; 312/223.2; 349/59
(58) Field of Classification Search ......... 361/679–686; 248/917–918; 345/87; 349/59
See application file for complete search history.

(56) References Cited

U.S. PATENT DOCUMENTS

| 5,119,204 | A | * | 6/1992 | Hashimoto et al. | ........... 348/794 |
| 5,672,850 | A | * | 9/1997 | Liu | ........................ 177/210 C |
| 5,831,816 | A | * | 11/1998 | Johns et al. | .................. 361/681 |
| 5,835,343 | A | * | 11/1998 | Johns et al. | .................. 361/681 |
| 6,130,658 | A | * | 10/2000 | Yamamoto et al. | .......... 345/102 |
| 6,556,433 | B1 | * | 4/2003 | Love et al. | ................... 361/685 |
| 7,172,114 | B2 | * | 2/2007 | Fletcher et al. | ............. 235/380 |
| 7,206,039 | B2 | * | 4/2007 | Kawamoto et al. | ............ 349/59 |
| 7,233,486 | B2 | * | 6/2007 | Kim | ........................... 361/681 |
| 2002/0135975 | A1 | * | 9/2002 | Schmidt | ..................... 361/681 |
| 2005/0162822 | A1 | * | 7/2005 | Shu | ............................. 361/683 |
| 2005/0206801 | A1 | * | 9/2005 | Miura | ........................ 349/58 |
| 2005/0220443 | A1 | * | 10/2005 | Nishida et al. | ............. 386/125 |
| 2006/0002063 | A1 | * | 1/2006 | Nishida | ..................... 361/681 |
| 2006/0209228 | A1 | * | 9/2006 | Nishida | ....................... 349/59 |
| 2006/0290812 | A1 | * | 12/2006 | Hsu | .......................... 348/552 |
| 2007/0081109 | A1 | * | 4/2007 | Igarashi | ....................... 349/58 |
| 2007/0153454 | A1 | * | 7/2007 | Chang et al. | ................. 361/681 |
| 2007/0247800 | A1 | * | 10/2007 | Smith et al. | ................. 361/683 |
| 2008/0052251 | A1 | * | 2/2008 | Moriya | ....................... 705/400 |

FOREIGN PATENT DOCUMENTS

| JP | 2005-277635 | 10/2005 |
| JP | 2005-295146 | 10/2005 |

* cited by examiner

Primary Examiner—Jayprakash N Gandhi
Assistant Examiner—Anthony Q Edwards
(74) Attorney, Agent, or Firm—Global IP Counselors, LLP

(57) ABSTRACT

A liquid crystal display device includes a liquid crystal module, a disk drive and a wiring board. The liquid crystal module has protrusions formed on a back plate of the liquid crystal module. The disk drive has attachment components aligned with the protrusions and fixed to the protrusions. The wiring board is disposed between the liquid crystal module and the disk drive. The wiring board has holes into which the protrusions are inserted.

9 Claims, 5 Drawing Sheets

LIQUID CRYSTAL DISPLAY DEVICE

CROSS-REFERENCE TO RELATED APPLICATIONS

This application claims priority to Japanese Patent Application No. 2006-144020 filed on May 24, 2006. The entire disclosure of Japanese Patent Application No. 2006-144020 is hereby incorporated herein by reference.

BACKGROUND OF THE INVENTION

1. Field of the Invention

The present invention generally relates to a liquid crystal display device. More specifically, the present invention relates to a liquid crystal display device with a disk drive.

2. Background Information

There are combination audio-visual devices in which a LCD television receiver or other such liquid crystal display device is coupled with another type of AV device. One of the combination audio-visual devices is a liquid crystal display device with a disk drive. In the liquid crystal display device, a CD drive/DVD drive or other such disk drive is incorporated as the other type of AV device. The liquid crystal display device includes a liquid crystal module, a control-use wiring board, disk drive, or the like. The control-use wiring board and the disk drive overlap a back of the liquid crystal module with an aim of preserving as much of the flatness of the liquid crystal display device as possible (See Japanese Laid-Open Patent Application 2005-295146 and Japanese Laid-Open Patent Application 2005-277635, for example).

As shown in FIG. 4, another conventional liquid crystal display device with a disk drive includes a liquid crystal module 1, a wiring board 2, a disk drive 3 and sheet metal spacers 4. The liquid crystal module 1 includes a display face (not shown) of a liquid crystal cell and a sheet metal back plate 12. The display face is disposed on a front of the liquid crystal module 1. The sheet metal back plate 12 is disposed on a back of the liquid crystal module 1. The wiring board 2 and the disk drive 3 are attached in an overlapping state to the back of the liquid crystal module 1.

When the disk drive 3 overlaps a back of the wiring board 2 that is itself disposed on the back of the liquid crystal module 1, the sheet metal spacers 4 are interposed between the wiring board 2 and the disk drive 3 to ensure enough space to accommodate electrical and electronic mounted components mounted on the wiring board 2 between the wiring board 2 and the disk drive 3. Therefore, the electrical and electronic mounted components mounted on the wiring board 2 will not interfere with the disk drive 3.

FIG. 5 shows a specific attachment structure of the liquid crystal module 1, the wiring board 2, the disk drive 3 and the spacers 4. Here, the wiring board 2 has screw components 13 that bulge from the back plate 12 of the liquid crystal module 1, and the spacers 4 is attached to the wiring board 2. Next, attachment screws 51 are inserted into screw insertion holes in the wiring board 2 and into screw insertion holes in screw tabs 41 of the spacers 4. Then, the attachment screws 51 are threaded into screw holes of the screw components 13 and tightened. The spacers 4 are attached at a plurality of locations to the back plate 12. Furthermore, attachment screws 52 are inserted into screw insertion holes of screw fastening brackets 31 of the disk drive 3. Then, the attachment screws 52 are threaded into screw holes of the spacers 4 and tightened. Accordingly, the disk drive 3 is attached at a plurality of locations to the spacers 4.

However, in the above conventional liquid crystal display device, enough space to accommodate the mounted components of the wiring board 2 is ensured by employing a structure in which the spacers 4 are additionally used to keep the disk drive 3 away from the wiring board 2. Therefore, there is additional need for the spacers 4 and the attachment screws 51 for attaching the spacers 4 to the liquid crystal module 1. This increases the number of parts and assembly time. Also, a stacked component structure is employed in which the disk drive 3 is stacked on the spacers 4, which are stacked on the wiring board 2. This causes variance in a positional accuracy of the screw fastening brackets 31 which are used as attachment components, and a variance in flatness of the attachment components is caused. Therefore, the attachment accuracy of the disk drive 3 is decreased.

In view of the above, it will be apparent to those skilled in the art from this disclosure that there exists a need for an improved liquid crystal display device with a disk drive. This invention addresses this need in the art as well as other needs, which will become apparent to those skilled in the art from this disclosure.

SUMMARY OF THE INVENTION

The present invention was conceived in light of the above problems. It is one object of the present invention to provide a liquid crystal display device with a disk drive which ensures enough space to accommodate mounted components of a wiring board by keeping the disk drive away from the wiring hoard, and provide less variance in flatness of attachment components of the disk drive.

In accordance with one aspect of the present invention, a liquid crystal display device includes a liquid crystal module, a disk drive and a wiring board. The liquid crystal module has protrusions formed on a back plate of the liquid crystal module. The disk drive has attachment components aligned with the protrusions and fixed to the protrusions. The wiring board is disposed between the liquid crystal module and the disk drive. The wiring board has holes into which the protrusions are inserted.

With the liquid crystal display device of the present invention, enough space to accommodate mounted components of the wiring board is ensured between the wiring board and the disk drive by suitably setting height of protrusions formed on the back plate of the liquid crystal module. Also, since a structure is employed in which the attachment components of the disk drive are fastened with screws to the protrusions, there is no need for the spacers 4 or the attachment screws 51 shown in FIGS. 4 and 5. Thus, there is a corresponding reduction in the number of parts and assembly time. Furthermore, the disk drive is attached to the protrusions formed on the back plate of the liquid crystal module. The disk drive is not stacked on the wiring board. Since there is no stacked component structure in the attachment components of the disk drive, variance is less likely to occur in the flatness of the attachment components of the disk drive.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

A preferred embodiment of the present invention will now be explained with reference to the drawings. It will be apparent to those skilled in the art from this disclosure that the following description of the preferred embodiment of the present invention is provided for illustration only and not for the purpose of limiting the invention as defined by the appended claims and their equivalents.

Figure 1:
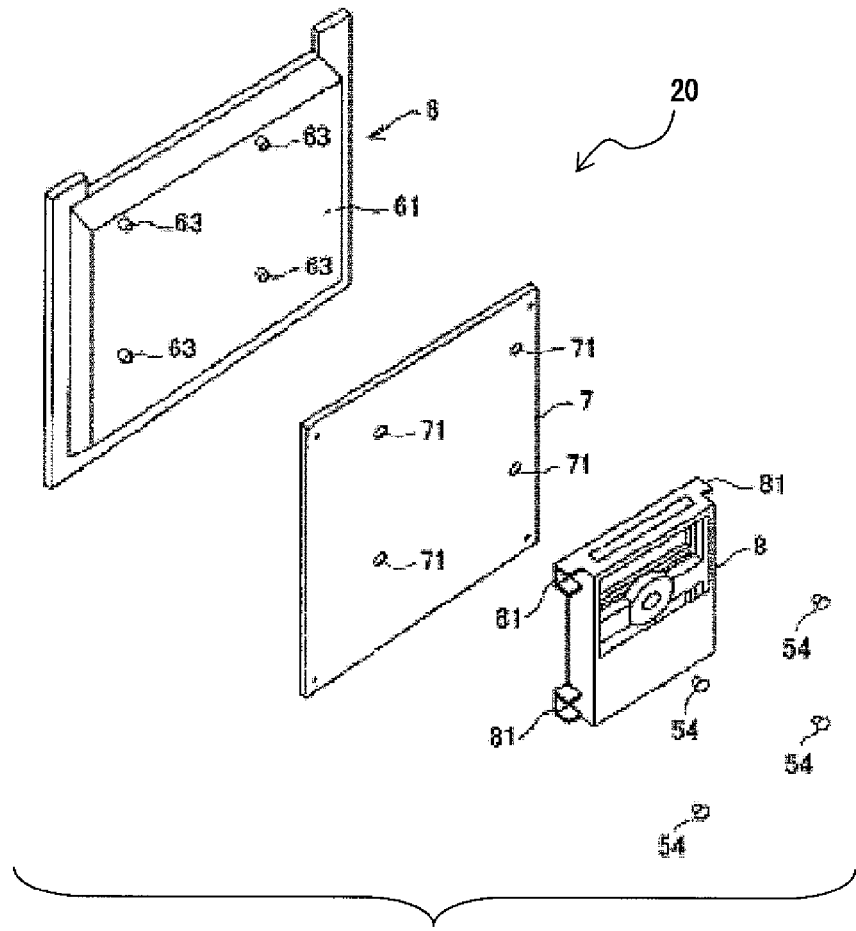
FIG. 1 is a simplified, exploded oblique view of main components of a liquid crystal display device with a disk drive pertaining to the present invention.

As shown in FIG. 1, a liquid crystal display device 20 includes a liquid crystal module 6, a wiring board 7, a disk drive 8 and a display body (not shown). In this embodiment, the liquid crystal module 6 corresponds to a liquid crystal module used in an LCD television receiver, for example. The wiring board 7 is a control-use wiring board for the liquid crystal display device 20. Electrical and electronic mounted components (not shown) are mounted on the wiring board 7. The disk drive 8 corresponds to a DVD drive, for example. However, it will be apparent to one of ordinary skill in the art from this disclosure that it is also possible to employ a CD drive or a magnetic tape device as the disk drive 8. The display body houses the liquid crystal module 6, the wiring board 7 and the disk drive 8.

The liquid crystal module 6 includes a display face (not shown) of a liquid crystal cell and a back plate 61. The display face is disposed on a front of the liquid crystal module 6. The back plate 61 is preferably molded from a resin, for example. The back plate 61 is disposed on a back of the liquid crystal module 6. The wiring board 7 and the disk drive 8 are attached in an overlapping state to the back of the liquid crystal module 6. In particular, the wiring board 7 is disposed between the liquid crystal module 6 and the disk drive 8.

Figure 2:
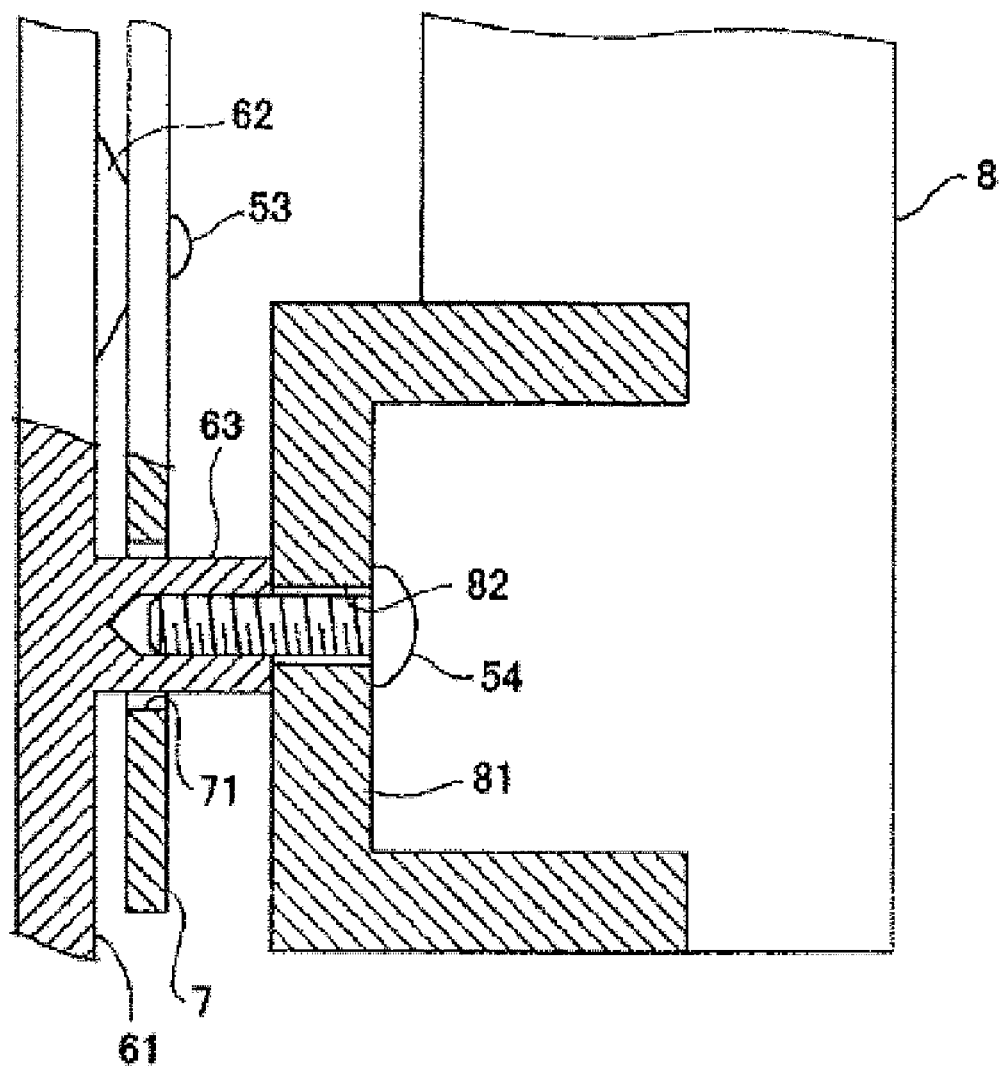
FIG. 2 is a partial cross section of a structure by which the disk drive is attached to a liquid crystal module in the liquid crystal display device.

As shown in FIG. 2, the back plate 61 includes screw components 62 and protrusions 63. The screw components 62 are integrally molded so as to bulge out from the back plate 61. The wiring board 7 is aligned with the screw components 62 and fastened to the liquid crystal module 6 by attachment screws 53. The protrusions 63 are integrally molded at four places on the back plate 61 of the liquid crystal module 6 in the form of bosses.

The wiring board 7 includes holes 71. As shown in FIGS. 1 and 2, the holes 71 are made at four places in the wiring board 7. The protrusions 63 are inserted into the holes 71. The disk drive 8 includes screw fastening brackets (or attachment components) 81. As shown in FIG. 2, the screw fastening brackets 81 are aligned with the tops of the protrusions 63. Attachment screws 54 are inserted into screw insertion holes 82 formed on the screw fastening brackets 81. The attachment screws 54 are threaded into the protrusions 63 and tightened. Accordingly, the disk drive 8 is attached at four places to the liquid crystal module 6.

Here, the height to which the protrusions 63 protrude from the back plate 61 of the liquid crystal module 6 is set such that there is enough space to accommodate electronic mounted components of the wiring board 7 between the wiring board 7 attached to the screw components 62 of the back plate 61 and the disk drive 8 attached to the protrusions 63 of the back plate 61.

Figure 4:
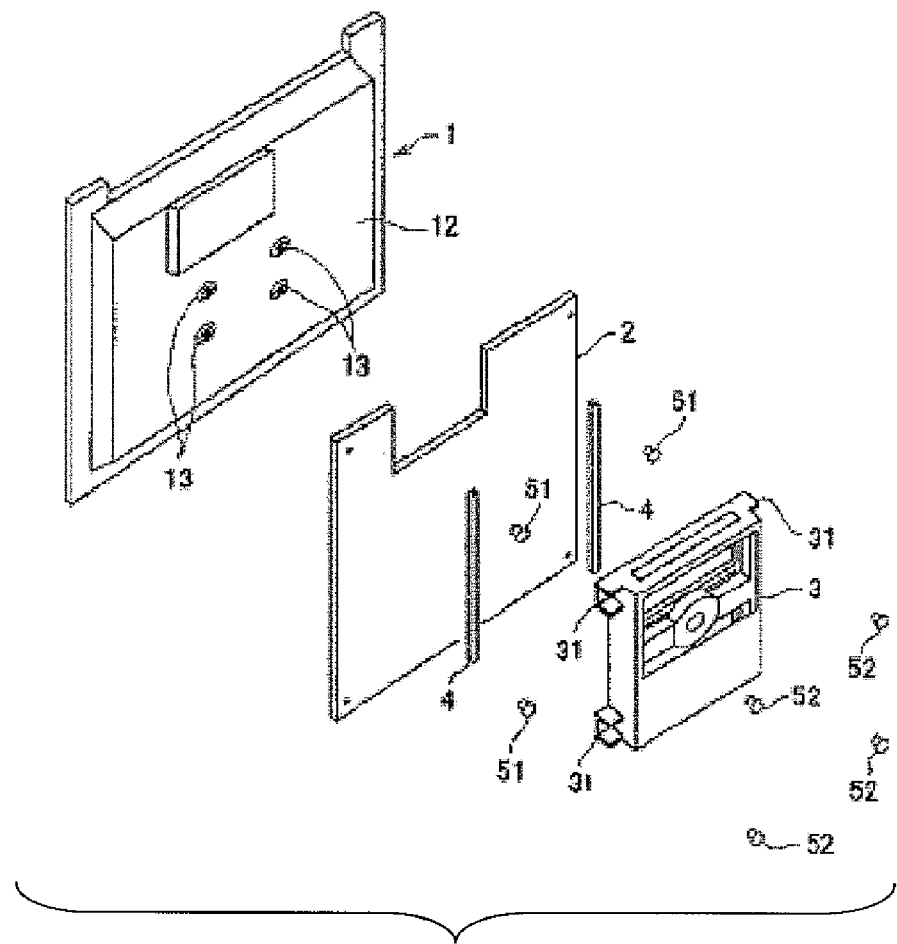
FIG. 4 is a simplified, exploded oblique view of main components of a conventional liquid crystal display device with a disk drive.
Figure 5:
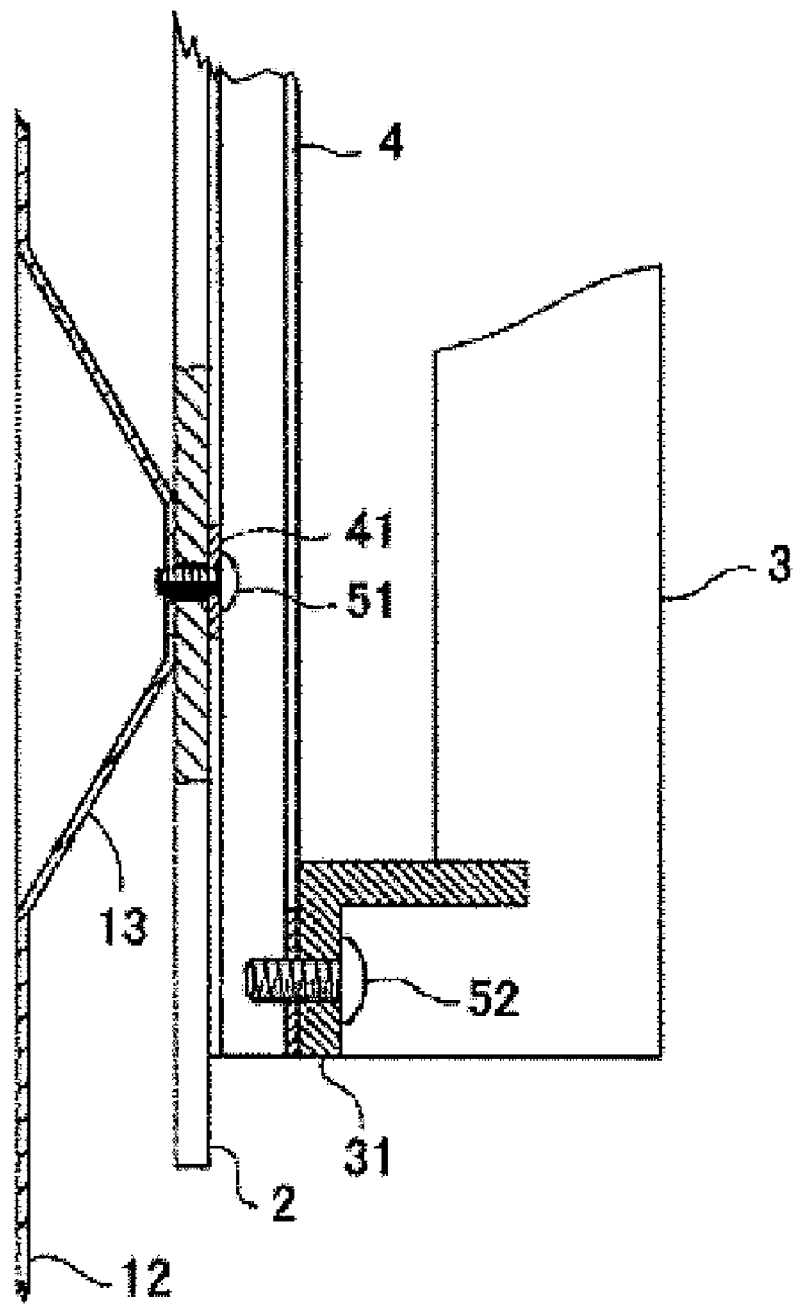
FIG. 5 shows a partial cross section of a structure by which the disk drive is attached to a liquid crystal module in the conventional liquid crystal display device.

Comparing the liquid crystal display device 20 with the conventional liquid crystal display device of FIGS. 4 and 5, there is no need for the spacers 4 or the attachment screws 51 used to attach the spacers 4. Therefore, there is a corresponding reduction in the number of parts and assembly time. This improves the productivity of the liquid crystal display device 20, and helps to lower costs. Also, with the liquid crystal display device 20, the disk drive 8 is screwed to the protrusions 63 that protrude from the back plate 61 of the liquid crystal module 6, and not to the wiring board 7. Therefore, there is no stacked component structure in an attachment of the disk drive 8. As a result, variance in a positional accuracy of the screw fastening brackets 81 relative to the liquid crystal module 6 or flatness of an attachment face of the screw fastening brackets 81 relative to the liquid crystal module 6 is less likely to occur since the protrusions 63 are integrally provided to the liquid crystal module 6. This not only contributes to better overall performance of the liquid crystal display device 20, but also contributes to higher productivity of the liquid crystal display device 20.

Figure 3:
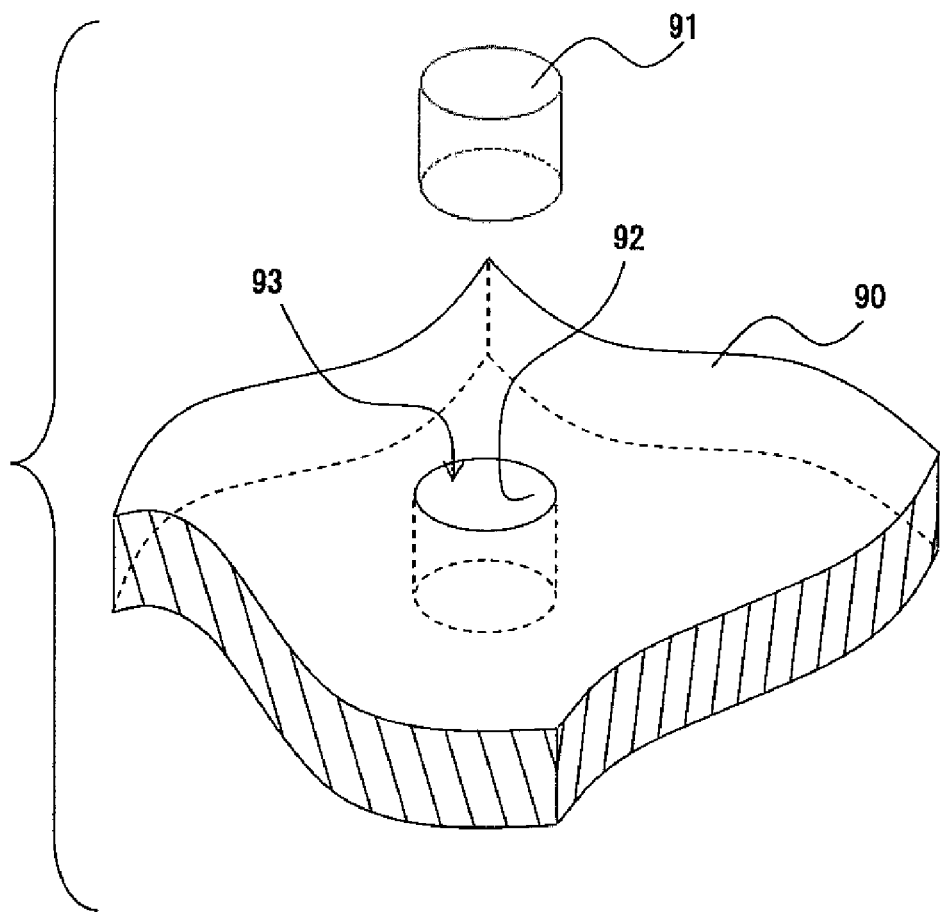
FIG. 3 is a partial sectional view of a metal mold and an insert.

The wiring board 7 here need not be used only as a control-use wiring board for the liquid crystal display device 20, but may also be used as a control-use wiring board for a liquid crystal display device that is not equipped with a disk drive. In this case, it preferable not to make the holes 71 in the wiring board 7 because this will narrow effective formation regions of circuit patterns on the wiring board 7. Also, the protrusions 63 on the back plate 61 of the liquid crystal module 6 are unnecessary when the wiring board 7 is used as the control-use wiring board for the liquid crystal display device that is not equipped with the disk drive. Referring to FIG. 3, the protrusions 63 on the back plate 61 of the liquid crystal module 6 are formed by utilizing molding face walls 92 of insert insertion holes 93 that are formed in a metal mold 90 used to mold the back plate 61. When the protrusions 63 are unnecessary, inserts 91 are inserted into the insert insertion holes 93 to block off the insert insertion holes 93. This makes it possible to form a back plate having no protrusions by using the same metal mold as the one used to mold the back plate 61 having the protrusions 63. Therefore, an advantage is that the metal mold 90 used to mold the back plate 61 of the liquid crystal module 6 in the liquid crystal display device 20 is also used to mold the back plate of a liquid crystal module of a liquid crystal display device that does not have a disk drive. As a result, sharing the metal mold 90 reduces costs.

General Interpretation of Terms

In understanding the scope of the present invention, the term "comprising" and its derivatives, as used herein, are intended to be open ended terms that specify the presence of the stated features, elements, components and groups, but do not exclude the presence of other unstated features, elements, components and groups. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, the following directional terms "forward, rearward, above, downward, vertical, horizontal, below and transverse" as well as any other similar directional terms refer to those directions of a liquid crystal display device equipped with the present invention. Accordingly, these terms, as utilized to describe the present invention should be interpreted relative to a liquid crystal display device equipped with the present invention as used in the normal viewing position.

While only a preferred embodiment has been chosen to illustrate the present invention, it will be apparent to those skilled in the art from this disclosure that various changes and modifications can be made herein without departing from the scope of the invention as defined in the appended claims. Furthermore, the foregoing description of the preferred embodiment according to the present invention is provided for illustration only, and not for the purpose of limiting the invention as defined by the appended claims and their equivalents.

What is claimed is:

1. A liquid crystal display device comprising:
   a liquid crystal module having protrusions formed on a back plate of the liquid crystal module;
   a disk drive having attachment components aligned with the protrusions and fixed to the protrusions; and
   a wiring board disposed between the liquid crystal module and the disk drive, the wiring board having holes into which the protrusions are inserted.

2. The liquid crystal display device according to claim 1, wherein
   the disk drive and the wiring board are disposed on the back plate of the liquid crystal module.

3. The liquid crystal display device according to claim 2, wherein
   the wiring board is attached overlapping the back plate of the liquid crystal module.

4. The liquid crystal display device according to claim 3, wherein
   the back plate of the liquid crystal module is molded from a resin, and
   the protrusions are integrally molded on the back plate of the liquid crystal module.

5. The liquid crystal display device according to claim 4, wherein
   the attachment components of the disk drive are aligned with tops of the protrusions such that there is enough space to accommodate mounted components of the wiring board between the wiring board and the disk drive.

6. The liquid crystal display device according to claim 5, wherein
   the protrusions are configured to be molded by utilizing molding face walls of insert insertion holes disposed at a metal mold for molding the back plate, and
   the insert insertion holes are configured to be blocked off by installing inserts.

7. The liquid crystal display device according to claim 1, wherein
   the protrusions are inserted through the holes of the wiring board so that the protrusions are directly fixed to the attachment components of the disk drive.

8. The liquid crystal display device according to claim 7, further comprising
   an attachment screw inserted through a screw insertion hole formed on each of the attachment components of the disk drive and threaded into each of the protrusions to directly fix the protrusions to the attachment components of the disk drive.

9. The liquid crystal display device according to claim 1, wherein
   the liquid crystal module further has screw components integrally molded on the back plate of the liquid crystal module at locations different from locations where the protrusions are formed, and
   the wiring board is directly fixed to the screw components by screws.

* * * * *